United States Patent [19]
Forestier

[11] Patent Number: 5,533,043
[45] Date of Patent: Jul. 2, 1996

[54] INSTALLATION FOR PRODUCING LIQUID METAL BY MELTING SCRAP IRON

[75] Inventor: Guy Forestier, Saint-Just-Saint-Rambert, France

[73] Assignee: CLECIM, Cergy Pontoise, France

[21] Appl. No.: 242,108

[22] Filed: May 13, 1994

[30] Foreign Application Priority Data

May 13, 1993 [FR] France ................... 93 05786

[51] Int. Cl.⁶ ............................... F27D 13/00
[52] U.S. Cl. ................... 373/9; 373/9; 373/81
[58] Field of Search ................ 373/8, 9, 43, 46, 373/78–81; 432/1, 11, 17, 23; 266/901

[56] References Cited

U.S. PATENT DOCUMENTS

| | | | |
|---|---|---|---|
| 794,212 | 7/1905 | Benjamin | 373/80 |
| 3,163,520 | 12/1964 | Collin et al. | 373/80 |
| 3,985,497 | 10/1976 | Fellnor et al. | 432/72 |
| 4,021,192 | 5/1977 | Ferguson et al. | 432/13 |
| 4,083,675 | 4/1978 | Fellnor et al. | 432/1 |
| 4,492,567 | 1/1985 | Saitoh | 373/80 |
| 4,506,370 | 3/1985 | Yoshimatsu | 373/8 |
| 4,543,124 | 9/1985 | Vallomy | 373/60 |
| 4,564,388 | 1/1986 | Vallomy | 75/46 |
| 4,609,400 | 9/1986 | Vallomy | 75/46 |
| 4,611,339 | 9/1986 | Saitoh | 373/80 |
| 4,736,383 | 4/1988 | Meierling | 373/78 |
| 4,784,603 | 11/1988 | Robak et al. | 432/5 |
| 4,922,505 | 5/1990 | van Ackerer et al. | 373/9 |
| 5,204,873 | 4/1993 | Imagawa | 373/108 |
| 5,264,020 | 11/1993 | Ehle et al. | 373/80 |
| 5,390,212 | 2/1995 | Bonnet et al. | 373/79 |

FOREIGN PATENT DOCUMENTS

| | | |
|---|---|---|
| 2137009 | 12/1972 | France. |
| WO92/10594 | 6/1992 | France. |
| 1121741 | 7/1968 | United Kingdom. |

*Primary Examiner*—Tu Hoang
*Attorney, Agent, or Firm*—Pollock, Vande Sande & Priddy

[57] ABSTRACT

An installation for the production of liquid metal by melting a charge of ferrous material, comprising at least one electric melting furnace consisting of a chamber closed by a removable roof and associated with consumable electrodes for melting the charge of ferrous material, at least one chamber for preheating the charge, and a main hot gas and flue gas removal circuit, equipped with a filtration device for removing pollutants. The preheating chamber is associated with one or more burners, and the gases produced in the chamber during preheating are sent to an auxiliary low-throughput treatment circuit equipped with an incineration chamber, and the flue gases produced in the furnace by the melting of the charge are sent directly to the main treatment circuit.

14 Claims, 6 Drawing Sheets

INSTALLATION FOR PRODUCING LIQUID METAL BY MELTING SCRAP IRON

FIELD OF THE INVENTION

The invention relates to an installation for producing liquid metal by melting a charge of ferrous material such as scrap iron.

BACKGROUND OF THE INVENTION

Electric arc furnaces have been used for a long time, and are increasingly used, for the production of steel by melting scrap iron or other ferrous raw material, for example, pre-reduced ore.

In general, an electric arc furnace comprises a melting chamber having a bowl-shaped bottom with a refractory lining and a lateral wall, with its upper portions closed by a removable arched roof, the chamber being associated with one or more electrodes connected to a power source. Each electrode is fixed to the end of an arm overhanging the chamber, and penetrates vertically into the chamber through an opening in the roof provided for this purpose.

In general, the furnace is supplied with a.c. power by means of several consumable electrodes. For some time, however, even for high capacities, d.c. furnaces have been used, and this offers certain advantages. In this case, one or more consumable electrodes are used, generally connected to the negative pole of the power source, and one or more fixed electrodes forming an anode, placed in the hearth, and connected to the positive pole of the power source, by one or more return conductors.

Such a furnace is, moreover, associated with a certain number of ancillaries such as electrical installations, means for charging scrap iron and additives, means for removing the molten steel and slag, flue gas removal and purification circuits etc.

Furthermore, to reduce the energy consumption, such an installation also generally comprises means of preheating the scrap iron before it enters the furnace.

This rather complex set of costly and bulky equipment is placed in a building which generally comprises a scrap iron reception and rehandling zone, a preheating zone and a preparation zone.

The raw scrap iron arrives in the reception zone in one or more transport containers or "baskets", which are picked up and transported from one zone to another by one or more overhead travelling cranes running above the entire installation.

Each basket is generally provided with an opening bottom for dumping the scrap into the chamber of the furnace whose roof has been removed. For this purpose, the arch making up the roof and the electrodes can be suspended from a horizontally-travelling gantry or, preferably, from arms mounted and rotating about a vertical shaft on a base placed next to the furnace.

During the melting and refining phases, the production of the steel generates a large volume of hot and dusty gases which must be purified before being discharged to the exterior. The arch closing the furnace is therefore provided with one or more openings connected to a purification circuit which comprises dust removal means.

The heat contained in these flue gases is usually recovered by using them to preheat the scrap. While awaiting charging, each new charge of scrap is therefore placed in a preheating chamber or cell placed next to the furnace and connected to the flue gas circuit of the furnace, which thus transfers their heat to the scrap placed in the chamber.

Before the flue gases enter the preheating chamber, they are often sent to a combustion chamber for burning off the carbon monoxide or other unburnts, and recovering a portion of the dust entrained by the flue gases.

The flue gas removal circuit of the furnace is therefore rather complex and bulky, and could be the source of accidental pollution.

Each basket containing a charge of cold scrap and positioned in the reception zone is picked up by the overhead travelling crane for transport to a preheating cell, where it remains for the necessary time. After preheating, the basket is transported by the overhead travelling crane above the chamber of the furnace into which the preheated scrap is dumped by opening the bottom.

Obviously, during charging, the arch of the furnace must be opened, and this causes a strong emission of flue gases. Steel and slag may also be projected when the scrap is dumped into the chamber.

To simplify the handling operations and to reduce the pollution, and, at the same time, to improve the thermal and energy efficiency, it was proposed some years ago to use a preheating chamber equipped with an opening bottom and with a removable cover, and capable of travelling between a preheating position next to the furnace and a position for dumping the scrap into the furnace. In the preheating position, the cover is opened, and a scrap charge is introduced into the chamber. The chamber is then closed and connected to the circuit evacuating the flue gases from the furnace. These hot gases pass through the chamber, transferring a portion of their heat to the scrap, and are removed by a duct to the purification circuit.

After preheating, the preheating chamber is positioned above the furnace to dump the preheated scrap by opening the bottom.

Applicant's EP 0514.526 discloses, an installation of this type improved in order to simplify the gas circuits and to reduce the risks of pollution.

However, it has been found that, while preheating the scrap helps to achieve some energy conservation, it may also present drawbacks. In fact, depending on the origin of the ferrous materials, and especially of the scrap iron used to produce the steel, harmful compounds, difficult to eliminate, are liable to be produced in the warming phase. This happens particularly in the case in particular of commercial scrap, which is often polluted by organic substances such as plastics, oils and paints, which generate organo-volatile compounds and particularly organo-chlorinated compounds, some of which, by decomposing, can produce toxic substances such as dioxins and furans.

To prevent such pollution, it is necessary either to sort the scrap iron, or to subject it to pretreatment. These operations obviously increase the cost of the scrap.

SUMMARY OF THE INVENTION

It is an object of the invention to overcome these drawbacks by means of a new process for preheating the scrap iron which helps to limit the risks of formation of toxic compounds and to facilitate their purification and destruction, and thus to use the scrap iron directly as it is found on the market.

Furthermore, the invention serves to simplify and to rationalize the hot gas and flue gas removal and treatment circuits.

The invention therefore generally relates to an installation for the production of liquid metal by melting a charge of ferrous material, comprising at least one electric melting furnace consisting of a chamber closed by a removable roof and associated with means of electrically melting a charge of ferrous material, at least one charge preheating chamber, and a main hot gas and flue gas removal circuit, equipped with pollutant removal means.

According to the invention, the preheating chamber is associated with independent heat input means, and the gases produced in the chamber are sent to an auxiliary low-throughput treatment circuit, equipped with specific pollutant removal means, and the flue gases produced in the furnace by the melting of the charge are sent directly to the main treatment circuit.

According to another particularly advantageous feature, the auxiliary low-throughput treatment circuit comprises a preheat gas incineration chamber equipped with a burner.

In a particularly advantageous manner, the heat input is achieved by means of a burner supplied with a sub-stoichiometric ratio of fuel to oxidizer.

It may thus be observed that, surprisingly, use is not made of the heat of the flue gases leaving the furnace to preheat the scrap. On the contrary, according to an essential feature of the invention, the gases and fumes respectively leaving the preheating chamber and the melting furnace are sent to separate circuits provided with distinct means of eliminating pollutants and designed to handle different throughputs.

This results in several advantages which are described in detail below.

The preheating chamber may be fixed, with the scrap being introduced therein through an opening fitted with a sealed door, in baskets which are then placed above the furnace for the dumping of the preheated scrap.

However, according to an arrangement already known in the prior art, the preheating chamber can itself be a charging means transferable between a position away from the furnace for the preheating of a charge of scrap, and a position above the furnace for the dumping of the preheated scrap. In this case, the chamber is equipped with an opening bottom which, in the preheating position, must be closed sufficiently tightly to prevent the infiltration of air.

According to another particularly advantageous feature of the invention, such a chamber can consist of an electric furnace arranged in such a way as to serve alternately for the preheating of the scrap and for its melting, such a furnace being equipped with heat input means for preheating. The gas removal opening made in the roof can accordingly be connected alternately to two separate circuits, respectively a preheating gas treatment circuit and a main melting flue gas purification circuit.

Such a furnace, arranged in order to serve successively for preheating and then melting the same charge of scrap, is preferably associated with a second identical furnace in a metal production installation.

In this case, one of the furnaces operates as a preheater while the other operates as a melting furnace, and the two chambers can be connected alternately and removably to one or the other of the gas removal and purification circuits.

To achieve the melting, each furnace can be associated with at least one vertically travelling consumable electrode, and the electrodes can be connected to the same electric power source by means of at least one change-over switch making it possible to connect the power source alternately to the electrode associated with the furnace used for melting by disconnecting the electrode associated with the furnace used for preheating, and vice versa.

However, it is also possible to use a single common means of melting for both furnaces, and comprising at least one consumable electrode mounted and sliding vertically on a support transferable between two positions, respectively from one or the other of the chambers for the introduction of the consumable electrode in the chamber that is used for melting.

In a first embodiment of the flue gas removal circuits, the opening made in the roof of each furnace can be connected, by a manifold, to a fork comprising two branches fitted with removable closure means, respectively a first branch for removal to the preheating gas treatment circuit, and a second branch for removal to the melting flue gas purification circuit.

In another embodiment, each furnace is connected to the main melting flue gas purification circuit by a removal duct equipped with a blower, and is associated with an auxiliary preheating gas treatment circuit connected by a bypass to said removal duct upstream of the blower, the removal opening made in the roof of each furnace being connected by a manifold to a fork fitted with removable closure means serving to send the gases either to the preheating gas treatment branch circuit, the corresponding blower being set at a reduced capacity, or directly to the main purification circuit, the corresponding blower being set at its nominal capacity.

BRIEF DESCRIPTION OF THE DRAWINGS

The above and other objects and advantages of the invention will be apparent from the detailed description of certain embodiments taken in conjunction with the accompanying drawings, wherein.

DETAILED DESCRIPTION

Figure 1:
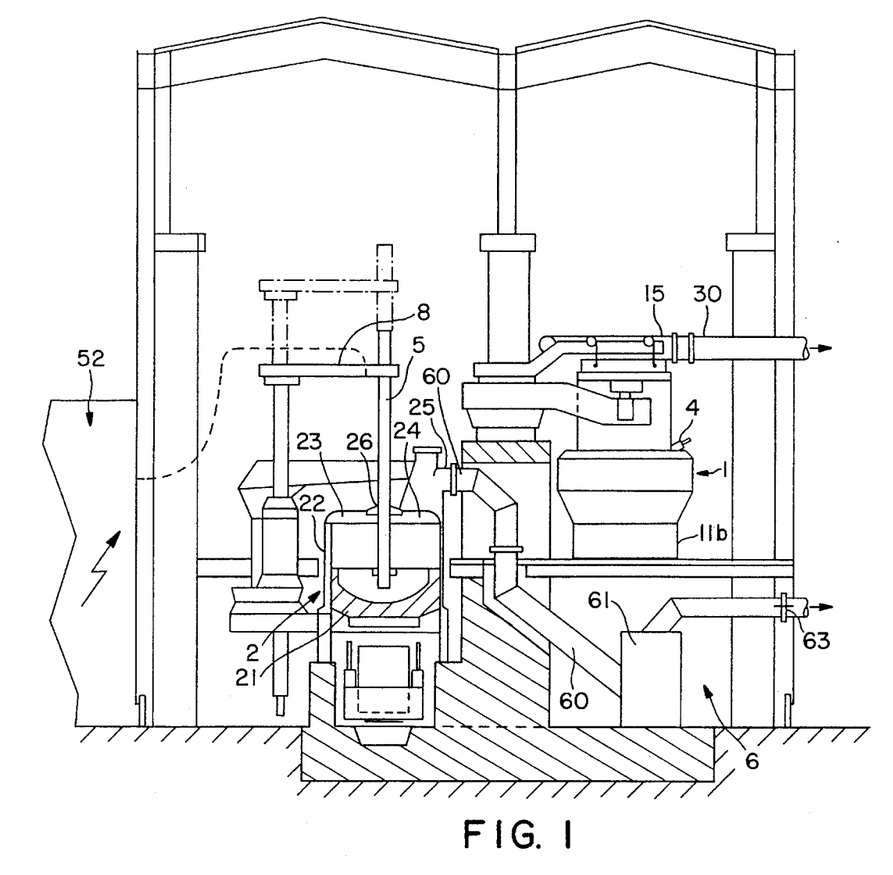
FIG. 1 is a schematic view of a metal production installation according to the invention.

FIG. 1 is a schematic view of a metal production installation of the type described in Patent No. EP.0514.526 already mentioned, and comprising a preheating chamber 1 and an electric melting furnace 2.

The melting furnace, which is advantageously of the tilting type, comprises a chamber 2 closed by a removable roof 23. The chamber 2 consists of a bowl-shaped bottom 21 lined with refractory material and prolonged upward by a cooled lateral wall 22. The arrangement is mounted in a frame resting on a base fixed by rounded support portions.

The furnace is also equipped with the usual arrangements for tapping the molten metal and slag.

The furnace 2 is of the electric type and can be supplied with a.c. or d.c. power. However, as will be shown below, it is particularly advantageous to use a furnace supplied with d.c. power and consequently comprising one or more consumable electrodes 5 forming a cathode, which can be introduced into the furnace by passing each through an opening in the roof 23, and one or more fixed electrodes 50 (FIG. 4), forming the anode, placed in the hearth 21, the electrodes being connected to the two terminals, respectively negative and positive, of a d.c. power source.

In the example shown in FIG. 1, the furnace is associated with a single consumable electrode 5 carried by an external support means such as a pivoting arm 8, and which can be introduced vertically into the furnace by passing through an opening 26 in the roof 23.

Furthermore, the roof 23 is equipped with at least one opening 24 terminating in a manifold 25 which can be connected by a duct 60 to a circuit 6 for flue gas evacuation and purification.

Figure 2:
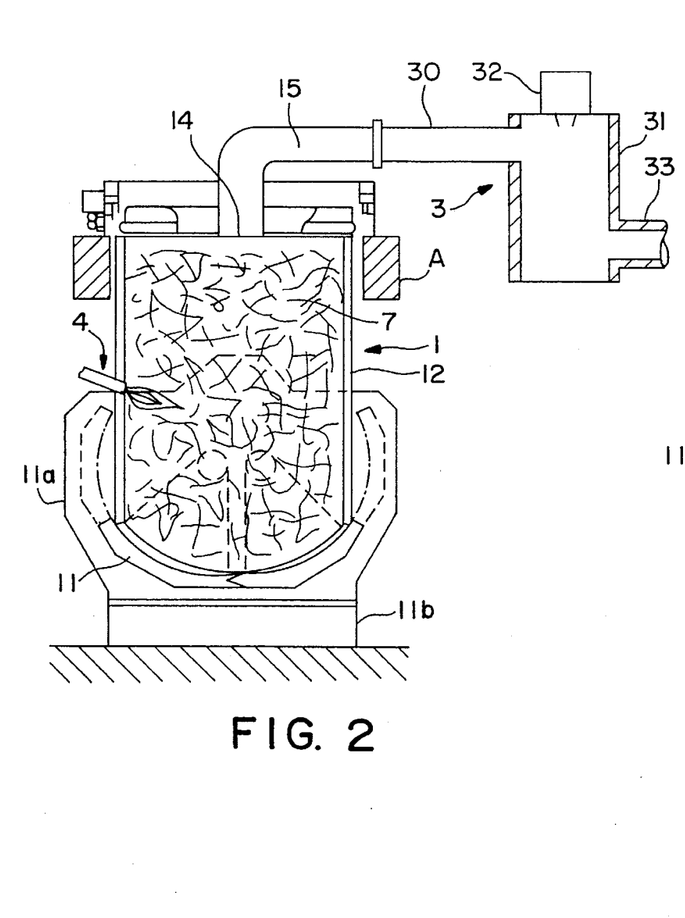
FIG. 2 is a cross-sectional view of a preheating chamber.

The preheating chamber 1, shown in detail in FIG. 2, comprises a an substantially cylindrical lateral wall 12, centered on a vertical axis 10, and having a upper portion closed by a removable roof 13 and a portion closed by an opening bottom 11, which, in the embodiment shown, consists of two shells which can open by pivoting about a horizontal axis.

The roof 13 is provided with an opening 14 prolonged by a manifold 15 which can be connected removably to a duct 30 for removing the gases circulating in the chamber 1.

In this way, according to a particular arrangement, which is the object of 0514.526, the preheating chamber 1 can advantageously be transferred between a first position, next to the furnace, for the preheating of the scrap, and a second position, above the furnace, for the dumping of the preheated scrap.

However, in the prior arrangement, the evacuation circuit of the flue gases produced in the electric furnace was connected, via a branch duct, to the base of the preheating chamber, in order to recover the heating power of the flue gases in the preheating chamber, and, after having passed through the chamber 1, these gases were sent to the flue gas removal circuit, downstream of the branch line.

As indicated above, the invention departs from this arrangement.

In fact, according to a feature of the invention, the preheating chamber 1 is equipped with independent means of heat input, such as one or more burners 4, and the gases and fumes produced in the preheating chamber 1 by the burner and by the heating of the scrap are sent, via a duct 30 connected to the manifold 15, to a specific treatment circuit 3.

In this way, the gas flow leaving the preheater 1 is considerably decreased, because it consists exclusively of the gas liberated by heating the scrap, to which only the flue gases emitted by the flame from the burner 4 are added.

As indicated, the purification of the flue gases and, in particular, the elimination of toxic compounds, is thus facilitated by the considerable decrease in the throughput to be treated.

In conventional solutions, on the contrary, it is necessary to treat all the flue gases from the furnace, in which the toxic compounds generated by preheating are diluted.

In this way, the invention permits the use of specific means of treatment of the preheating gases specially adapted to the types of compound contained in these gases, and which will only have to treat a reduced throughput.

Obviously, the flue gases leaving the furnace during the melting phase, must be sucked up and sent to conventional purification means, these means being designed to treat a large throughput, but without any risk of pollution by toxic compounds.

The use of one or more burners to preheat the scrap further serves to diminish the risk of emission of toxic compounds.

In fact, according to another particularly advantageous feature of the invention, the preheating chamber 1 is closed, after charging the desired quantity of scrap 7, in order to prevent the infiltration of air.

In addition, the relative flow rates of fuel and oxidizer in the burner or burners 4 are adjusted to a sub-stoichiometric ratio, i.e., with low air or oxygen content in order to maintain a reducing atmosphere inside the chamber 1. In this way, it is possible to oppose the formation of harmful compounds such as dioxins and furans, and the purification of the fumes sucked up by the circuit 3 can thus be simplified, since the risks of pollution are reduced.

Since the gases emitted by preheating are generally partially combustible, the gas removal duct 30 preferably terminates in an incineration chamber 31, where the gases are burned with supplementary energy input supplied, for example, by a post-combustion burner 32, as shown in FIGS. 2. The heat thus supplied can be recovered for any use.

At the exit of the incineration chamber 31, a duct 33 sends the gases to a purification unit with treatment of incompletely burned compounds, for example with filtration and treatment by activated charcoal. Such a unit (not shown) can be made in a known manner, and depends on the types of pollutant product contained in the scrap.

It is thus possible to carry out a sudden cooling of the flue gases, for example by water spray, in order to reduce the risks of recomposition of the toxic products in a temperature range that favors their formation, 300° to 600° C. for example.

As already stated, it is necessary for chamber 1 to be closed in a sufficiently tight manner in order to minimize air infiltration.

The roof 13 must therefore be applied tightly to the upper edge of the wall 12 and may, for example, be suspended, by lifting means, to a support B which is used to move it away from the chamber 1 for the opening of the chamber.

The shells making up the opening bottom may also be made in such a way as to ensure a sufficient tightness. However, it is advantageous to use an arrangement described in EP 514.526 already mentioned, in which the lower portion of the chamber 1 is surrounded by a skirt 11a which, by vertical movement of the chamber 1, can be applied tightly, in the preheating position, to a fixed base 11b with an adequate profile, the chamber 1 being lifted, after preheating, to permit its transfer.

The use, according to the invention, of a burner or other independent heating means associated with the preheating chamber, facilitates the transfers of the preheating chamber between its preheating position and the position of dumping into the furnace, because it suffices to disconnect the treatment circuit 3 to which the manifold 15 is removably connected.

Figure 3:
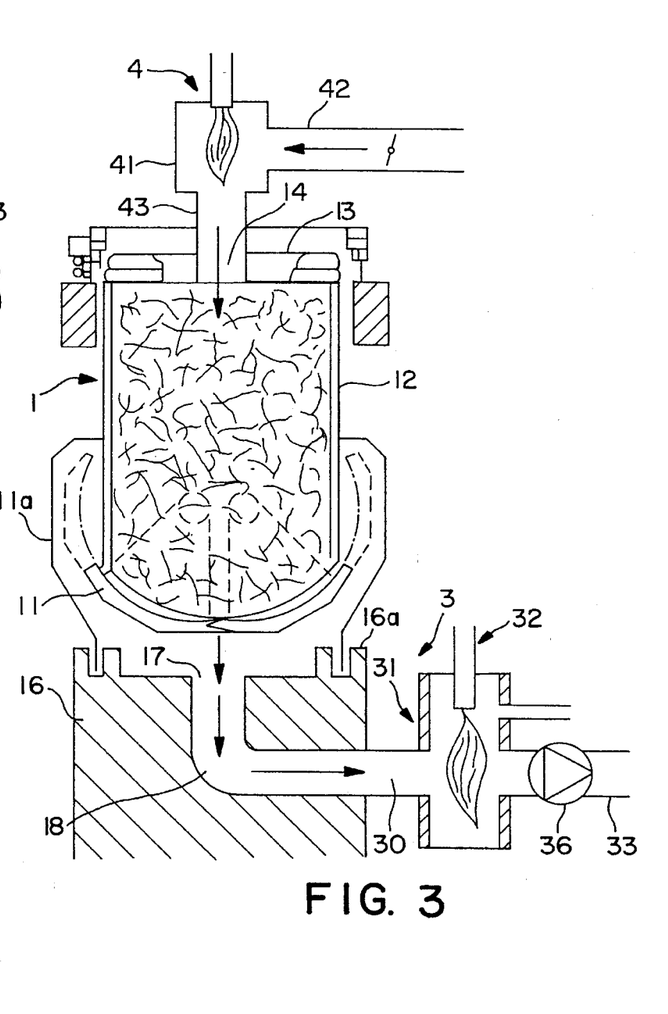
FIG. 3 is a cross-sectional view of another embodiment of the preheating chamber.

However, use can also be made of a fixed evacuation circuit according to the arrangement shown in FIG. 3.

In this case, the preheating chamber 1 is identical to the one described above, but the skirt 11a which surrounds the opening bottom 11 is applied, in the lowered position, against a closure base 16 of which the upper portion 16a has a profile matching the bottom portion of the skirt 11a to guarantee the tightness.

At the center of the base 16, there is an orifice 17 prolonged by a manifold 18 which is connected by a duct 30 to the incineration chamber 31.

As previously, the incineration chamber is provided with a post-combustion burner 32 to guarantee complete combustion of the gases leaving the preheater, the burnt flue being evacuated by duct 33 to the purification circuit.

In this case, the burner 4 is advantageously placed in the upper portion of the chamber 1, and can be associated with a combustion chamber 41 provided with an air inlet 42 and an outlet 43 connected to the opening 14 made in the roof 13.

The air flow entering through the inlet 42 is adjusted to take account of the primary air flow in the burner 4 in order to maintain a sub-stoichiometric ratio in the combustion gases entering the chamber 1.

Figure 4:
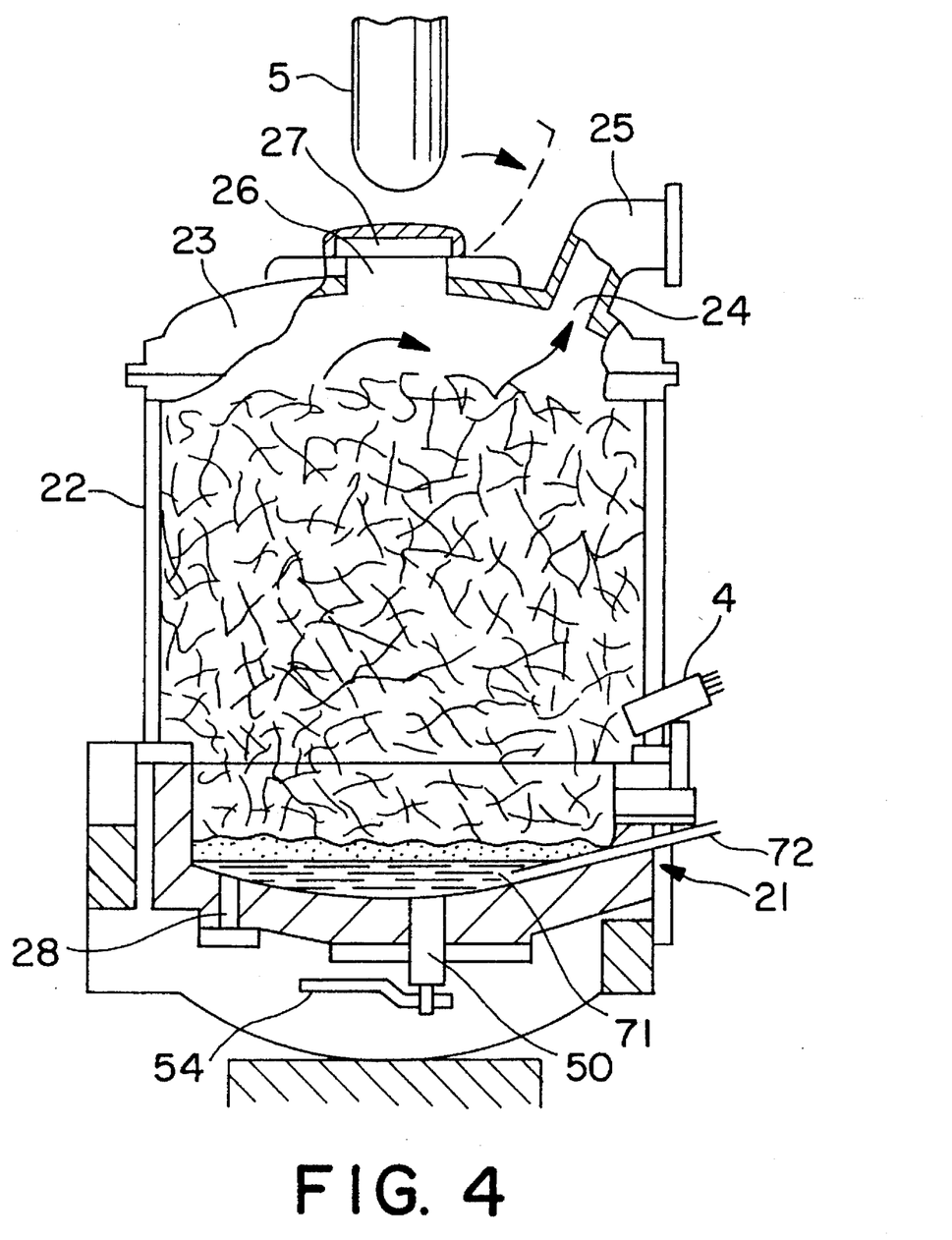
FIG. 4 is a cross-sectional view of an improved electric furnace usable alternately to preheat and to melt a charge of scrap.

To further reduce the risks of pollution, it is possible, in a particularly advantageous embodiment shown in FIG. 4, to avoid the scrap-handling operations by designing the electric furnace so that the charge is preheated directly therein.

Such a furnace remains of the conventional type and thus comprises a chamber 2 closed by a removable roof 23 in which an opening 26 is provided for the penetration of at least one electrode 5.

However, the roof 23 is provided, preferably, with a removable shutter 27 which tightly closes the furnace 2 when the furnace is used for preheating, and the electrode 5 is withdrawn.

Furthermore, the chamber 2 is provided with at least one burner 4 preferably placed at the base of the lateral wall 22, just above the upper edge of the bowl 21 of refractory material. Use can also be made of several burners distributed on the periphery of the furnace 2. Each burner is supplied with fuel and oxidizer, the relative flow rates of which can be adjusted to a sub-stoichiometric ratio in order to guarantee a reducing atmosphere in the furnace. The flue gases are evacuated through an opening 24 in the roof terminating in a manifold 25 which can be removably connected to the auxiliary treatment circuit 3 during the preheating phase.

When the scrap has been raised to the desired temperature, the burner 4 is shut off and the opening 26 is opened to introduce the consumable electrode 5 which is connected to the negative pole of the power source, the half electrode 50 being connected to the positive pole.

The auxiliary circuit 3 for treating the preheating gases is closed, and the manifold 25 is then connected to the usual purification and dust removal circuit 6 for the flue gases produced by melting.

The electrode 5 is progressively lowered as the scrap 7 melts, and the molten metal forms a liquid bath 71 which collects in the bowl 2.

At the end of melting, the liquid metal is poured in the usual manner. However, it is advantageous to preserve, in the bottom of the bowl, a residual bottom bath 71 above which, after opening the roof 23, a new scrap charge 7 is dumped.

Such a bottom bath 71 in fact serves to carry out a combined injection of oxygen and carbon by means of one or more nozzles 72 terminating inside the bottom bath 71. This oxygen injection into the molten metal can in fact, in addition to the burner 4 or even alone, provide the energy input necessary for preheating of the scrap and post-combustion of the gases emitted, the oxidizer flow rate being adjusted to maintain a reducing atmosphere inside the furnace 2.

Thanks to this use of the same chamber for preheating and for melting, operations for the transfer of the preheated scrap are avoided, and the risks of pollution are diminished, since the roof arch 23 of the furnace no longer needs to be opened. In addition, productivity and energy efficiency are improved.

Such an arrangement is particularly advantageous if two identical furnaces 1,1' are used, arranged so that each can serve alternately for preheating and for melting. Such an arrangement is shown schematically in FIG. 5.

Figure 5:
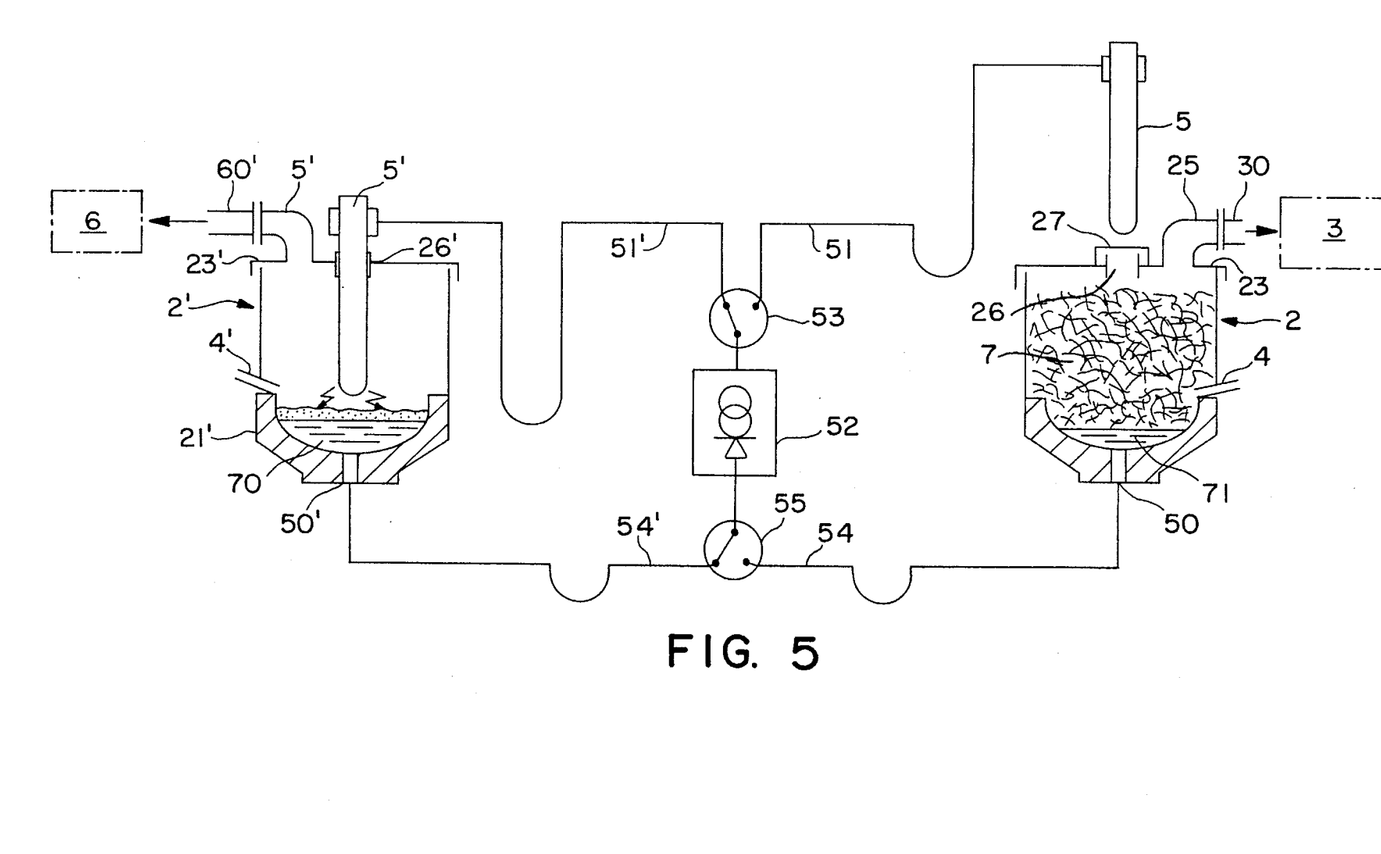
FIG. 5 is a schematic diagram of an installation comprising two furnaces which serve alternately for preheating and for melting.

In this case, the two operations can be performed simultaneously, with one of the furnaces, the right-hand furnace 2, for example, being placed in the preheating position, and the left-hand furnace 2' being placed in the melting position.

In the case shown, the two furnaces operate on d.c. power supply, each furnace 2,2' being associated with a consumable electrode 5,5' forming the cathode, and with a hearth electrode 50,50' forming the anode, and placed in the central portion of the bottom 21.

The right-hand furnace 2 is placed in the preheating position, with the consumable electrode 5 raised above the roof 13. The central opening 26 for passage of the electrode is closed by the cover 27. The manifold 25 is connected to a duct 30 which conveys the preheating gases to the auxiliary treatment circuit 3.

At the same time, the left-hand furnace 2' is in the melting position, with the consumable electrode 5' introduced into the chamber by passing through the opening 26'. The evacuation manifold 25' is connected to a duct 60' which conveys the flue gases from the furnace to the main purification circuit 6.

The consumable electrodes 5,5' and the fixed electrodes 50,50' are connected, respectively, to the two terminals of the power source 52 by feeder conductors 51,51' and return conductors 54, 54'.

The conductors are fitted with switches making it possible to supply the electrodes of one of the chambers and to isolate the other. For this purpose, it is advantageous to use electric change-over switches 53,55.

In the case shown in FIG. 5, the change-over switches 53,55' connect the power source 52 to the furnace 2 where melting is carried out, whereas the right-hand furnace 2 is electrically isolated and operates as a preheater. The chamber 2 has therefore been previously filled with a scrap charge 7 which is preheated by the burner 4 supplied, as described, with a low oxygen flow, the flue gases thus produced being evacuated, with the toxic compounds, to the auxiliary treatment circuit 3 by a duct 30 connected to the manifold 25.

In the meantime, the scrap charge preheated in the previous operation is melted in the left-hand furnace 2'. A bath of molten steel 70 is thus formed in the bowl 21', which can be treated in the usual manner, the furnace 2' being equipped with all the devices necessary for the operation of a d.c. furnace. Since these arrangements are known, they have not been shown in the figure.

When melting is complete, the molten metal is poured, for example, through a spout or tap hole 28 fitted with a slide nozzle, as shown in FIG. 4.

The functions of the two furnaces 2 and 2' can thus be reversed.

The cover 27 of the central opening 26 of the right-hand furnace 2 is opened to permit the lowering of the consumable electrode 5 until it makes contact with the preheated scrap. Using the change-over switches 53,55, the furnace 2 is connected to the power source 52 and then operates in the conventional way as an electric furnace, the left-hand furnace 2', then being isolated.

Furthermore, the electrode 5' has been withdrawn from the left-hand furnace 2' and the cover 23' has been opened to permit the introduction of a new scrap charge.

After charging, the cover 23 and the central opening 26' are closed, and the manifold 15' is connected to the auxiliary circuit 3 for treating the preheating gases, for example in the way described below and shown in FIG. 6.

The burner 4' of the furnace 2' is then be turned on, preferably with a sub-stoichiometric setting, to carry out the preheating.

The previous arrangement has therefore been reversed, the right-hand furnace 2 now serving to melt the previously preheated charge, and the left-hand furnace 2' serving to preheat the new charge.

The two furnaces 2 and 2' must therefore be associated with means making it possible to connect them alternately either to the auxiliary preheating flue gas treatment circuit 3 or to the main purification circuit 6.

Figure 6:
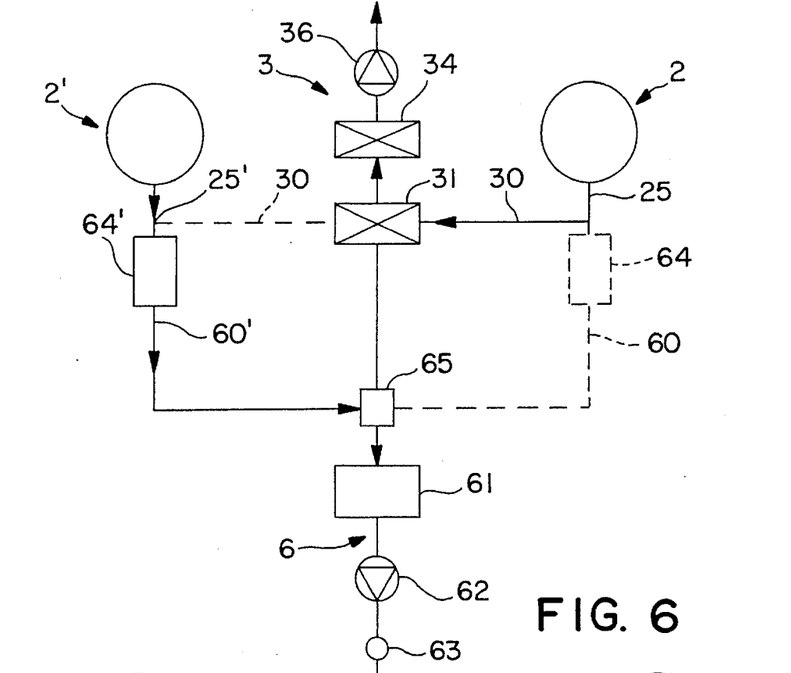
FIG. 6 is a schematic diagram of the hot gas and flue gas purification circuits.

It is possible, for this purpose, to use the arrangement shown in FIG. 6 which shows schematically the two furnaces 2 and 2' and the gas and flue gas suction circuits.

In the example shown, the furnace 2 is in the preheating position, and the evacuation manifold 25 is thus connected by a duct 30 to the auxiliary preheating gas treatment circuit 3 which, for example, comprises an incineration chamber 31 and various means 34 of fume treatment, the fumes being sucked up by a blower 35 and discharged to the chimney stack.

The furnace 2' is in the melting position, and its evacuation manifold 25' is therefore connected to a duct 60' which sends the flue gases produced by melting to a main purification circuit 6 essentially comprising a filtration device 61 and a main blower 62, which sucks the flue gases to and discharge them to the chimney stack 63.

Preferably, before being sent to the main purification circuit 6, the flue gases from the furnace 2' pass through a combustion chamber 64' for their incineration, in order to reduce the risks of pollution.

It is thus possible to recover at least a portion of the heating capacity of the flue gases.

The filtration device 61 can advantageously be preceded by a means of sudden cooling, such as a spray tower 65 installed downstream from the combustion chamber 64'.

To reverse the functions and to switch furnace 2 into the melting position, the duct 30 is cut off and the manifold 25 is connected to a duct 60 connected to the main purification circuit 6 and shown by a dotted line in FIG. 6, advantageously passing through a combustion chamber 64. In the same way, to place the furnace 2' in the preheating position, the duct 60' is cut off and the manifold 25' is connected to a duct 30' for connection to the auxiliary preheating gas treatment circuit 3.

It appears that the use of two identical furnaces arranged so as to serve alternately for preheating and for melting makes it possible to perform the operations practically in series. This results in an almost permanent use of the installed electric power capacity, since the electric power source, in practice, is only disconnected to reverse the connections.

Thus, besides limiting the risks of pollution, such an installation appears to be highly productive because it permits the optimal use of the installed electric power capacity.

As already indicated, the arrangements according to the invention serve to simplify the gas suction circuits, in particular by reducing the number of circuits and connections and disconnections of ducts which were necessary previously to permit the movement of the preheating chamber and/or the scrap baskets.

Similarly, by carrying out the preheating in the furnace itself, it is unnecessary to open the furnace to introduce the charge therein, and the risks of pollution are diminished.

In this case, the quantity of metal poured corresponds to a single charge, but, insofar as the two furnace operate alternately and almost without interruption, overall production can be maintained.

Productivity can also be substantially improved in the case of operation on a d.c. power supply source, if an improved furnace, as shown in FIG. 4, is used.

It is well known in fact that, for a furnace operating on a.c. power and normally using three consumable electrodes, these electrodes have a necessarily reduced resistance.

This is why, to date, it seemed necessary to limit the height of the scrap charged in the furnace so that the electrodes would not be subject to excessive stresses when they are introduced into the scrap and progressively cause the melting of the scrap.

On the other hand, if the furnace is supplied with d.c. power, it is possible, even for higher power capacities, to use a single electrode, which can therefore have larger dimensions, and which is also not subject to the electromagnetic effects to which the three electrodes of an a.c. furnace are subjected. Furthermore, this electrode is generally placed in the axis of the furnace, and is therefore stressed by the scrap in a relatively symmetrical manner.

Accordingly, such a single electrode can exhibit greater strength and can also be less stressed. It was therefore observed that it would be possible, for the same metal production, to increase the height of the scrap inside the furnace, and thus to charge, in a single step, the quantity of scrap corresponding to a normal charge of molten metal, and even in excess of of 100 t.

Such an arrangement is particularly advantageous in the case of the invention, in which the scrap can be charged cold into a furnace which first serves as a preheater, and is then no longer handled until it is melted.

This is why, according to another very advantageous feature of the invention, the lateral wall 12 of the furnace chamber thus exhibits a sufficient height for the chamber to contain all the scrap necessary to make up a normal charge. In this way, even in the case of large capacity furnaces, it is possible to introduce the entire cold charge of scrap needed, and thus to avoid having to re-open the furnace until the time of pouring, thus reducing the risks of pollution.

In all the embodiments described above, the preheating is carried out by means of a burner supplied with a sub-stoichiometric ratio, but a heat input could also be obtained by the injection of oxygen and/or of a carbonaceous product in a residual bottom bath of steel. In some cases, however, other means could be used, for example electrical, to provide the necessary heat, while maintaining a reducing atmosphere in the chamber.

Figure 7:
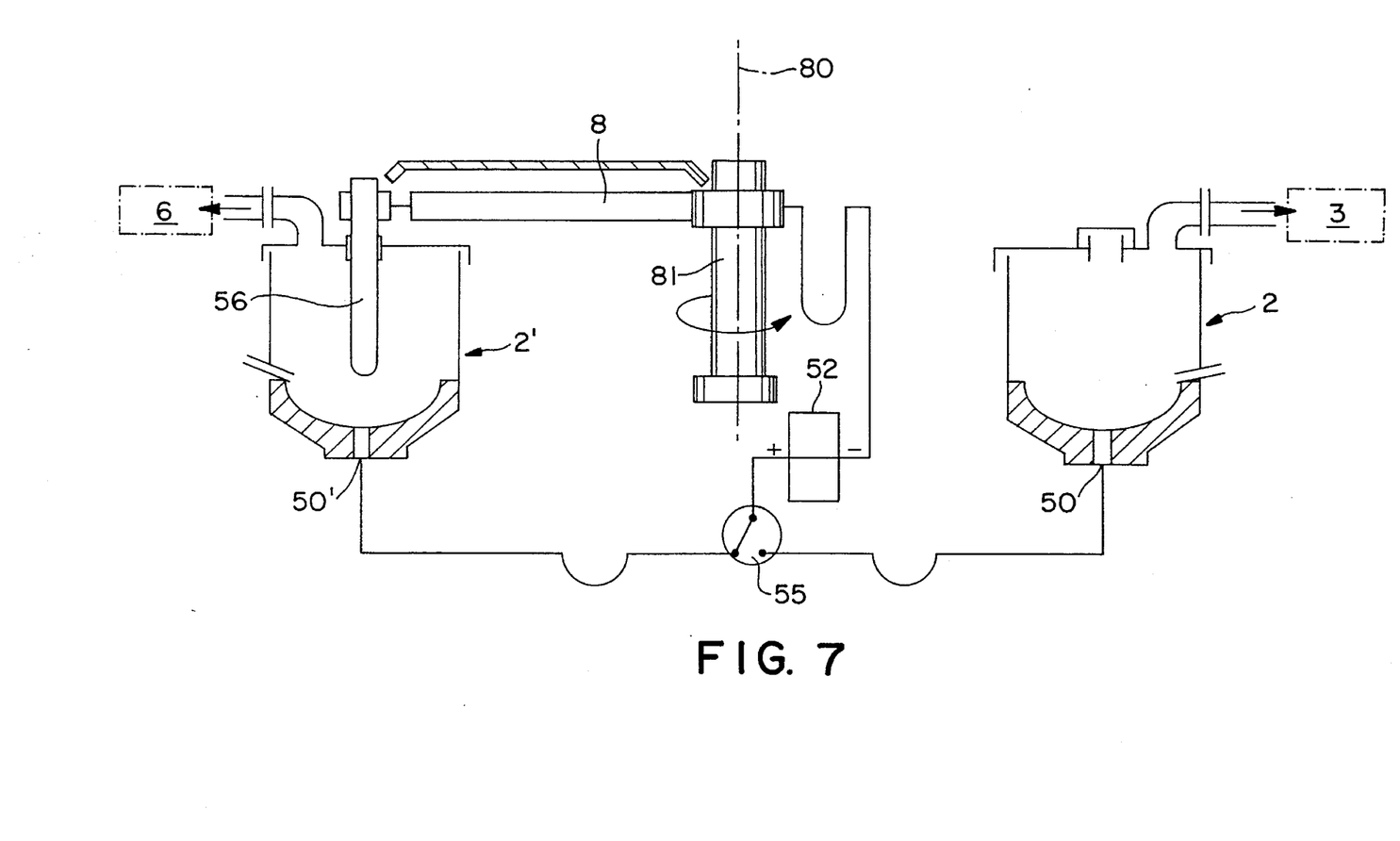
FIG. 7 is a schematic diagram of a variant of the installation showing another electrical connection mode.
Figure 8:
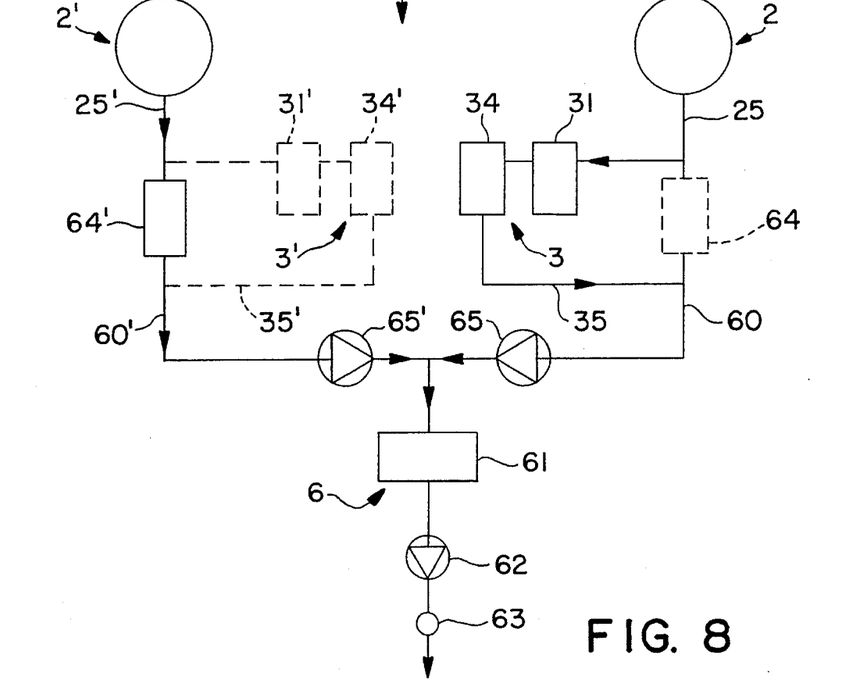
FIG. 8 is a schematic diagram of another embodiment of the purification circuits.

Furthermore, in the case of an installation with two furnaces, other arrangements can be adopted, as shown in FIGS. 7 and 8. It is possible, in fact, to associate both furnaces 2 and 2' with a single consumable electrode 55 mounted sliding vertically at the end of a support arm 8 which can rotate on a base 81 about a vertical axis 80 placed equidistant between the two furnaces so that, by rotation of the arm 8, the consumable electrode 56 can be placed alternately above the furnace 2 or above the furnace 2'.

In this way, the feed conductor connected to the consumable electrode 56 can remain connected permanently to the negative terminal of the power source 52, the hearth electrodes 50,50' being connected alternately to the negative terminal by the change-over switch 55. This arrangement thus helps to simplify the installation and to use a single electrode support.

Modifications can also be made to the flue gas evacuation circuits, for example in the way shown in FIG. 8.

In this case, each furnace 2,2' is connected to the main purification circuit 6 by a duct 60 to which is bypassed an auxiliary circuit 3,3' for the treatment of preheating gases, comprising an incineration chamber 31 and a treatment and cooling device 34.

The manifold 25(25') then remains connected to the duct 60(60') upstream from a fork fitted with closure means which serve to send the gases either directly to the combustion chamber 64(64') and the circuit 6, or, by a branch duct 30(30'), to the treatment circuit 3(3') with the gases being returned, after treatment, to the circuit 6 by a return duct 35(35').

On each duct 60(60'), which conveys the flue gases to the purification circuit 6, a discharge blower 65(65') is placed, with an adjustable rate.

In FIG. 8, the circuits and apparatuses in service have been shown in solid lines, and the portions not conveying the gases are indicated in dotted lines.

It is thus possible to see that the gases leaving through the manifold 25 of the furnace 2 which operates in preheating mode are sent to the auxiliary treatment circuit 3, the combustion chamber 64 being short-circuited. The corresponding blower 65 then operates at reduced capacity.

On the other hand, the flue gases leaving furnace 2', in which melting is carried out, pass directly into the combustion chamber 64' and are discharged to the main purification circuit 6 by the blower 65' which operates at its nominal rate. The auxiliary treatment circuit 3' is then short-circuited.

Obviously, such a system could be further modified. For example, a single auxiliary treatment circuit 3 could be used connected by ducts 30(30') and 35(35'), fitted with removable closure means, respectively upstream and downstream of the combustion chamber 64(64') associated with the two furnaces 2 and 2'.

The reference signs, inserted after the technical features mentioned in the claims, are only intended to facilitate the understanding of the claims, and in no way limit their scope.

I claim:

1. An installation for the production of liquid metal by melting a charge of ferrous material, said installation comprising:

(a) at least one electric melting furnace consisting of a chamber having a bottom and a lateral wall and closed by a removable roof;

(b) means for introducing a charge of ferrous material into said chamber;

(c) electrical means for melting said charge to produce melting gases with a throughput of a first magnitude, said electrical means comprising at least one consumable electrode removably connected to an electrical power source and means for introducing said at least one consumable electrode into said chamber by passing through at least one central opening provided in said roof;

(d) at least one cover for removably closing said at least one central opening;

(e) independent heat input means associated with said furnace for preheating said charge of ferrous material contained in said chamber before introduction of said electrode, said preheating producing preheating gases with a reduced throughput of a second magnitude less than said first magnitude;

(f) at least one evacuation opening provided in said roof and associated with means for removably connecting said evacuation opening with evacuation means for evacuating gases produced in said chamber by preheating and melting, respectively;

(g) a main treatment circuit comprising a main blower and purification means adapted to said throughput of melting gases;

(h) an auxiliary treatment circuit comprising an auxiliary blower and fume treatment means adapted to said reduced throughput of preheating gases;

(i) said evacuation opening being connected with said auxiliary treatment circuit by said removably connecting means in a first, preheating position of said furnace for which said charge is preheated by said independent heat input means, said consumable electrode being withdrawn and said central opening being closed by said cover; and (j) said evacuation opening being connected with said main treatment circuit in a second, melting position of said furnace for which said charge is melted by introduction of said consumable electrode connected to the power source after opening said removable cover, said independent heat input means being shut off.

2. The installation of claim 1, wherein said auxiliary treatment circuit comprises a chamber equipped with a burner for incineration of preheating gases.

3. The installation of claim 1, wherein said independent heat input means are provided to supply heat input with maintenance of a reducing atmosphere in said furnace and said furnace is closed sufficiently tightly to prevent entry of air that is liable to alter a stoichiometric ratio of fuel to oxides.

4. The installation of claim 3, wherein said independent heat input means comprise at least one burner supplied with a sub-stoichiometric ratio.

5. The installation of claim 1, wherein said furnace is associated with said at least one consumable electrode and at least one fixed electrode placed in said bottom, said electrodes being connected, respectively, to two poles of a d.c. power source.

6. The installation comprising two identical furnaces, as claimed in claim 1, respectively a first furnace and a second furnace adapted to serve alternately for preheating of a charge of ferrous material and for melting of said charge, and two treatment circuits, respectively a main treatment circuit and an auxiliary treatment circuit, said two furnaces being connected alternately and removably to one or the other of said treatment circuits, one of said first and second furnaces serving for preheating and being connected to said auxiliary treatment circuit, and the other of said first and second furnaces serving for melting and being connected to said main treatment circuit.

7. The installation of claim 6, wherein each of said identical furnaces is associated with at least one consumable electrode vertically movable in order to penetrate into said furnace, and wherein the electrodes associated respectively with said two furnaces are connected to a same electric power source by at least one changeover switch to alternately connect to said power source the electrode associated with the chamber which serves for melting and the electrode associated with the chamber which serves for preheating.

8. The installation of claim 6, wherein said two furnaces have common melting means comprising at least one consumable electrode mounted for vertical sliding movement on a support adapted to travel between two positions, respectively, of introduction of said consumable electrode into the one of said two furnaces which serves for melting.

9. The installation of any one of claims 6 to 8, wherein each furnace is closed by a roof provided with at least one opening for introduction into said chamber of at least one said consumable electrode, each opening being fitted with tight closure means after withdrawal of said at least one consumable electrode, and wherein each chamber is associated with means capable of providing a quantity of heat necessary for preheating while maintaining a reducing atmosphere in said furnace, wherein said roof and said central opening for passage of said consumable electrode are closed in substantially airtight manner during preheating.

10. The installation of claim 1, wherein said auxiliary treatment circuit comprises a chamber for incineration of preheating gases, equipped with a burner.

11. The installation of claim 1, wherein said lateral wall of said furnace has a sufficient height so that, in accordance with dimensions of said bottom and differences in density between said ferrous material and molten metal, said charge to be preheated introduced into said furnace produces, upon melting, a quantity of molten metal sufficient for one pouring or casting operation.

12. The installation of claim 1, wherein the independent heat input means comprise at least one injection nozzle of one of an oxidizer and of a carbonaceous product in a bottom bath left in said bottom on pouring of said metal, and above which a new charge of scrap to be preheated is placed.

13. The installation of claim 6, wherein said opening in said roof of each furnace is adapted to be connected by a manifold to a fork comprising two branches fitted with removable closure means, respectively, one branch for evacuation to said auxiliary treatment circuit and one branch for evacuation to said main treatment circuit.

14. The installation of claim 6, wherein each furnace is connected to said main treatment circuit by an exhaust duct equipped with a blower and associated with an auxiliary preheating gas treatment circuit connected by a branch line to said exhaust duct upstream from said blower, said opening in said roof of each furnace being connected by a manifold to a fork fitted with removable closure means making it possible to send the gas either to the branch preheating gas treatment circuit, whereby the corresponding blower is set at a low rate, or directly to said main treatment circuit, whereby the corresponding blower is set at a nominal rate of said blower.

* * * * *